Oct. 2, 1962 R. J. DONAHUE ET AL 3,056,545

TAPE PERFORATING MACHINE

Filed Jan. 8, 1959 8 Sheets-Sheet 1

INVENTORS
ROBERT J. DONAHUE
BY STANLEY J. APPLEBAUM
Morrison, Kennedy & Campbell
ATTORNEYS Oct. 2, 1962 R. J. DONAHUE ET AL 3,056,545

TAPE PERFORATING MACHINE

Filed Jan. 8, 1959 8 Sheets-Sheet 2

INVENTORS
ROBERT J. DONAHUE
STANLEY J. APPLEBAUM
BY Morrison, Kennedy & Campbell
ATTORNEYS INVENTORS
ROBERT J. DONAHUE
STANLEY J. APPLEBAUM
BY Morrison, Kennedy & Campbell
ATTORNEYS Oct. 2, 1962 R. J. DONAHUE ET AL 3,056,545

TAPE PERFORATING MACHINE

Filed Jan. 8, 1959 8 Sheets-Sheet 4

INVENTORS
ROBERT J. DONAHUE
STANLEY J. APPLEBAUM
BY Morrison, Kennedy & Campbell
ATTORNEYS INVENTORS
ROBERT J. DONAHUE
STANLEY J. APPLEBAUM
BY Morrison, Kennedy & Campbell
ATTORNEYS INVENTORS
ROBERT J. DONAHUE
BY STANLEY J. APPLEBAUM
Morrison, Kennedy & Campbell
ATTORNEYS INVENTORS
ROBERT J. DONAHUE
BY STANLEY J. APPLEBAUM
Morrison, Kennedy & Campbell
ATTORNEYS

TAPE PERFORATING MACHINE

Filed Jan. 8, 1959 8 Sheets-Sheet 8

INVENTORS
ROBERT J. DONAHUE
STANLEY J. APPLEBAUM
BY Morrison, Kennedy & Campbell
ATTORNEYS 3,056,545

TAPE PERFORATING MACHINE

Robert J. Donahue, Brooklyn, and Stanley J. Applebaum, Roslyn Heights, N.Y., assignors to Mergenthaler Linotype Company, a corporation of New York Filed Jan. 8, 1959, Ser. No. 785,699
55 Claims. (Cl. 234—4)

This invention relates to phototypographical machines and more particularly to machines in which a line of text material is composed at a keyboard, and the information representative thereof is stored, preferably on a perforated control tape, preparatory to its reproduction on film in order that justification, quad right or centering information, as desired, can be determined and such information utilized during the photographic reproduction of the line to provide a justified, quadded right, or centered line as the case may be. The present invention relates specifically to an apparatus for determining justification, quad right, or centering information and for converting it to a form wherein it can be coded on the perforated tape and utilized to control photography of a line of text material. Included with such apparatus is a line length device for indicating the extent of line composition during the composing of a line.

The apparatus of the present invention may be used or incorporated in a keyboard machine of the type disclosed in United States Patents Nos. 2,816,609 and 2,848,049. These patents disclose machines that produce control tapes whereon lines of composed text material, including justification, quad right, or centering information that controls photography of a line in the desired manner, are represented as code signals. The coded control tape may thereupon be used in a photographic machine of the type disclosed in United States applications Serial Nos. 419,012 and 696,448, filed March 26, 1954 and November 14, 1957, respectively, where the text material represented by the coded signals on the control tape is recorded on a sensitized film as latent images.

Therefore, the above identified applications may be referred to for an understanding of a phototypographical machine in which an apparatus according to the present invention may be used, and the present specification need concern itself only with the apparatus for determining justification, quad right, or centering information for lines of composed text material.

Phototypographical machines, of which the aforementioned may be considered representative, are usually based on a unit system of character width. In such a system, each typographical character and each normal interword space has a set width of so many units and a unit is a sub-part of a typographical em. Thus, in an eighteen unit system, a typographical em is divided into eighteen parts, each of which is deignated a unit. Each typographical character used in such a system is designed so that its set width corresponds with a multiple of a single unit. For example, a lower case "i" may be assigned a width of four units and an upper case "M" may be assigned a width of eighteen units. Each character in a font of typographical characters is similarly assigned a set width. Hence, when a linge of typographical characters i composed, the length of that line will be some multiple of the basic unit of an em. Furthermore, when operating under such a system, the margin to margin or justified length of the line will be measured in units of an em.

When composing a line of text, it is generally the case that the total of the set widths of the typographical characters and normal word spaces that go to make up the line does not equal the justified line length, but rather is less than such line length, thereby leaving a deficit or line remainder. In order to justify the line of characters, the line remainder must be apportioned among the interword spaces. This can be accomplished in many ways, one of which is shown and described in aforementioned Patents Nos. 2,816,609 and 2,848,049. The apparatus there disclosed employs a predetermined answer drum and read out mechanism that are selectively positioned to provide the proper answer for a large combination of line remainders and interword spaces. In the second mentioned patent, the apparatus additionally provides mechanism which maintains a continuing indication of line remainder information that can be read out to give quad right and centering information.

While the prior apparatus is eminently satisfactory in providing the required information, it is mechanical in nature and expensive to manufacture. Moreover, one of the serious objections to its use arises from its noisy performance which detracts from its desirability as a composing machine suitable for office use. In addition, the servicing of the apparatus requires the attendance of a skilled mechanic, since the complexity thereof does not lend itself to ready repair.

In order to overcome the foregoing limitations as well as to gain certain benefits as will be apparent from the specification that follows, there is provided, according to the present invention, an electronic device that computes justification information by dividing the units-of-an-em line remainder by the number of interword spaces in the composed line. If the number of interword spaces is an aliquot part of the line remainder, then the quotient of the dividing operation will represent the number of units of an em that must be added to each interword space to give a justified line. On the other hand, if the number of interword spaces is an aliquant part of the line remainder, then the quotient represents the number of units of an em that must be added to each interword space while the remainder represents the number of interword spaces that must have an additional unit-of-an-em added thereto in order to provide a justified line. The electronic computer, in addition to effecting the dividing operation, also converts the answer to binary form, which has been found most useful in controlling the operation of the photographic unit in a two unit photocomposing machine. The electronic computer, furthermore, maintains a continuing count of the line remainder and is capable of coding this information, again in binary form, when such is required for lines of text that are to be quadded right. The quad right information, however, is coded as ems and units-of-an-em, or more specifically as tens of ems, ones of ems and units-of-an-em. Moreover, the electronic computer is capable of coding, in binary form, and from the line remainder count, the information that is required to center a line of text. In this instance, the line remaider count is divided by two, so that the information is coded as ens and units of an em, or more specifically, tens of ens, ones of ens and units-of-an-em.

In carrying out the present invention, there is provided (1) a first pulse counter that is settable to accord with the desired total line length, (2) a character width counter that has a fixed capacity that exceeds the maximum character width and is settable each time a character key is depressed to a count that is equal to the capacity of the counter minus the width of the character represented by the depressed key, (3) a pulse generator, (4) means for controlling the pulse generator so that it delivers a succession of pulses to the first pulse counter and to the character width counter until the capacity of the latter counter is reached, whereby in the first pulse counter the widths of individual characters are subtracted from the initially set line length to give a continuing line remainder count, (5) means for controlling the pulse generator after a key is depressed for the last character in the line so that a succession of pulses are delivered to the first pulse counter until the count therein is reduced to zero, and (6) means for delivering the pulses that are required to reduce the count in the first counter to zero to an answer computing device wherein a justification, quad right, or centering answer, as selected, is computed.

Moreover, in keyboard actuated tape producing machines of the type above referred to, there is provided a line length device which indicates to the machine operator the white space remaining in a line and thus enables him to determine whether the line will justify when the tape is used to control the photographic machine. This device, in the two patents above mentioned, was mechanical in nature since it was actuated by the same mechanism that actuated the computer device. Consequently, in addition to the computer of the present invention, a new improved line length device that utilizes electronic components is also provided.

The line length device, aside from being used in conjunction with a justification computing device, may also be used in a keyboard actuated machine that produces a control tape for a line casting machine, such as the well known Teletypesetter.

Features and advantages of this invention may be gained from the foregoing and from the specification of a preferred embodiment thereof which follows.

Referring to the drawings.

Figure 1:
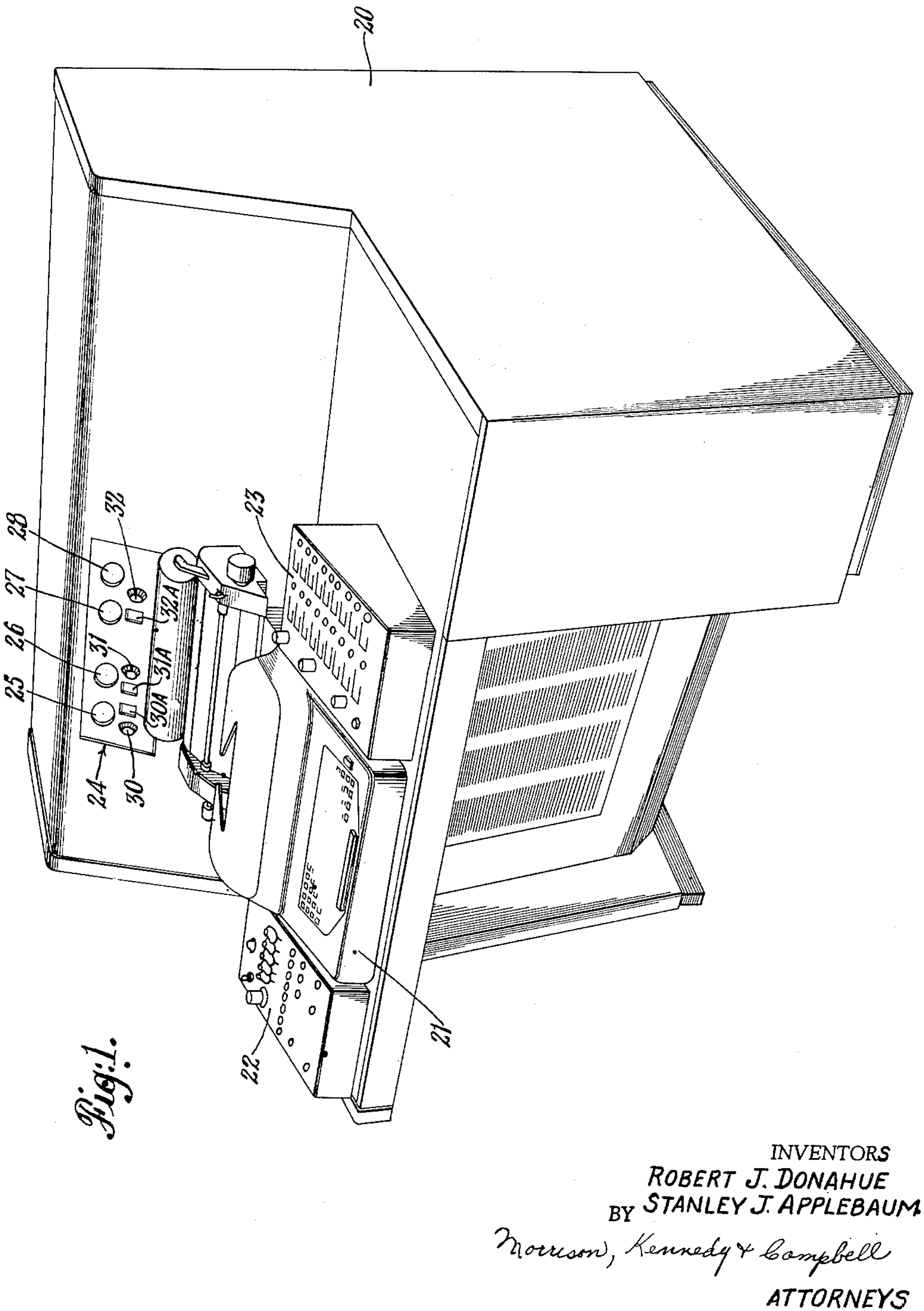
FIG. 1 is a perspective view of the control tape producing machine of the present invention showing particularly the keyboard arrangements and the line length indicator.

Referring to FIG. 1, there is shown a keyboard console 20 upon which a modified standard electric typewriter 21 is mounted. The typewriter is modified to the extent that the actuation of a finger key, in addition to effecting a typing operation, also engages an electric contact to complete circuits for the coding of character identification and character width information on the control tape. This is more completely disclosed in the aforementioned Patent No. 2,848,049. The character width information is also transmitted by engagement of the electric contacts to the circuits of the present line length indicator device, which will be more fully described hereinafter. Auxiliary keyboards 22 and 23 may be furnished to provide additional keys should they be desired to enable coding of other information not normally found on a typewriter. Thus, keyboard 22 may contain controls to provide quad spaces, letterspace characters and select the manner in which a composed line will be photographed, i.e. justified, quadded or centered, and keyboard 23 may contain the font selection controls.

Figure 7:
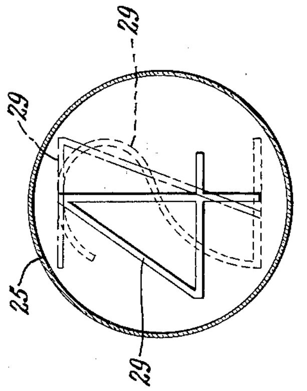
FIG. 7 is a schematic representation of a numerical indicator tube that is utilized in the line length indicator mechanism.

Above the keyboard is the line length indicator 24 which comprises four digit indicator cold cathode tubes arranged in a horizontal row. The tubes may be those manufactured by Burroughs Corporation and sold as numerical indicator tubes, type 6844A. The tubes 25, 26, 27 and 28 have (FIG. 7) ten cathodes 29 arranged adjacent the upper end thereof. Each cathode is shaped in the form of a numeral and the arrangement is such that by selectively energizing a cathode, any digit from 0 to 9 may be illuminated and made visible through the end of the tube.

The tube 25 disposed toward the left represents the ems-ten value of line length while the next adjacent tube 26 represents the ems-ones value of line length. The next tube 27 in line represents the units-of-an-em tens value of line length and the last tube 28 represents the units-of-an-em (ones) value of line length. The four tubes taken together indicate the line length in ems and units-of-an-em. Before keyboarding a line, the justified line length is set by adjustment of knobs 30, 31 and 32 which actuate rotary switches that in turn condition electrical circuitry to accord with the desired justified line length. Dials associated with each knob provide a numerical indication of the preset line length which is visible through windows 30A, 31A and 32A formed in the front panel of console 20 as well as on the face of tubes 25, 26, 27 and 28. However, as a line is keyboarded, the numerical value indicated by the tubes is continuously decreased by the individual widths of the characters being keyboarded. The operator is thus given a running count of the amount of space, in ems and units-of-an-em, of the line remainder. When the line remainder is reduced to a value such that justification can be effected, an audio and/or visual signal is given to the operator to inform him of this fact.

For purposes of simplification, the entire circuit for the keyboard apparatus, is not shown, but only representative portions thereof are disclosed to illustrate the principle of operation of the various circuits, it being understood, of course, that in all instances the omitted circuits are similar to those shown. However, in FIG. 2, there is shown a schematic circuit diagram of the signal circuitry which is brought into operation when a character key is depressed.

Upon depression of a character key of the typewriter 21 or composing keyboard (see FIG. 2), the key lever will close the contacts of a pair of switches 33 and 34, a similar pair of switches being associated with each character key of the keyboard. Similarly closed are the contacts of universal switch 35, which contacts are closed whenever any character key is depressed. Depending on whether the shift key is in shift or unshift position, single-pole, double throw switch 36 will be actuated so that common contact 40 engages shift contact 41 or unshift contact 42 respectively. If a keyboard is used having separate keys for the shift and unshift characters, that is, the upper case and lower case characters as in the typewriter, switch 36 can be eliminated and the circuits to be described traced directly. The provision of switch 36 stems from the fact that in a typewriter a single character key operates contacts for two different characters, these generally being the upper and lower case representations of a letter but in some instances totally different characters.

If it is assumed that the character key for actuating switches 33 and 34 is depressed, and that the shift key is in shift position, a circuit can be traced from common line 43, through contacts of universal switch 35, and the contact for the particular character selected, to conductor 44. There will in fact be as many conductors 44 as there are characters to be composed. However, a description of the circuitry for a single conductor, or in other words for a single character, will suffice for an understanding of the invention.

Conductor 44 at junction 45 divides into two parallel circuits, one for identification of the character associated with the depressed key, and the other for recording its width. Consideration will first be given to the identification circuits. Conductor 44 is connected through feed 47 to the character diode coder 46 which is more specifically described in aforementioned Patent No. 2,848,049. Suffice it to say now that, in effecting the character identification code, the signal is converted to an eight station binary code which is transmitted over conductors 50, 51 etc., to the tape perforator 52. Again, reference may be had to Patent No. 2,848,049 for a fuller description of the perforator solenoid control circuits.

Figure 2:
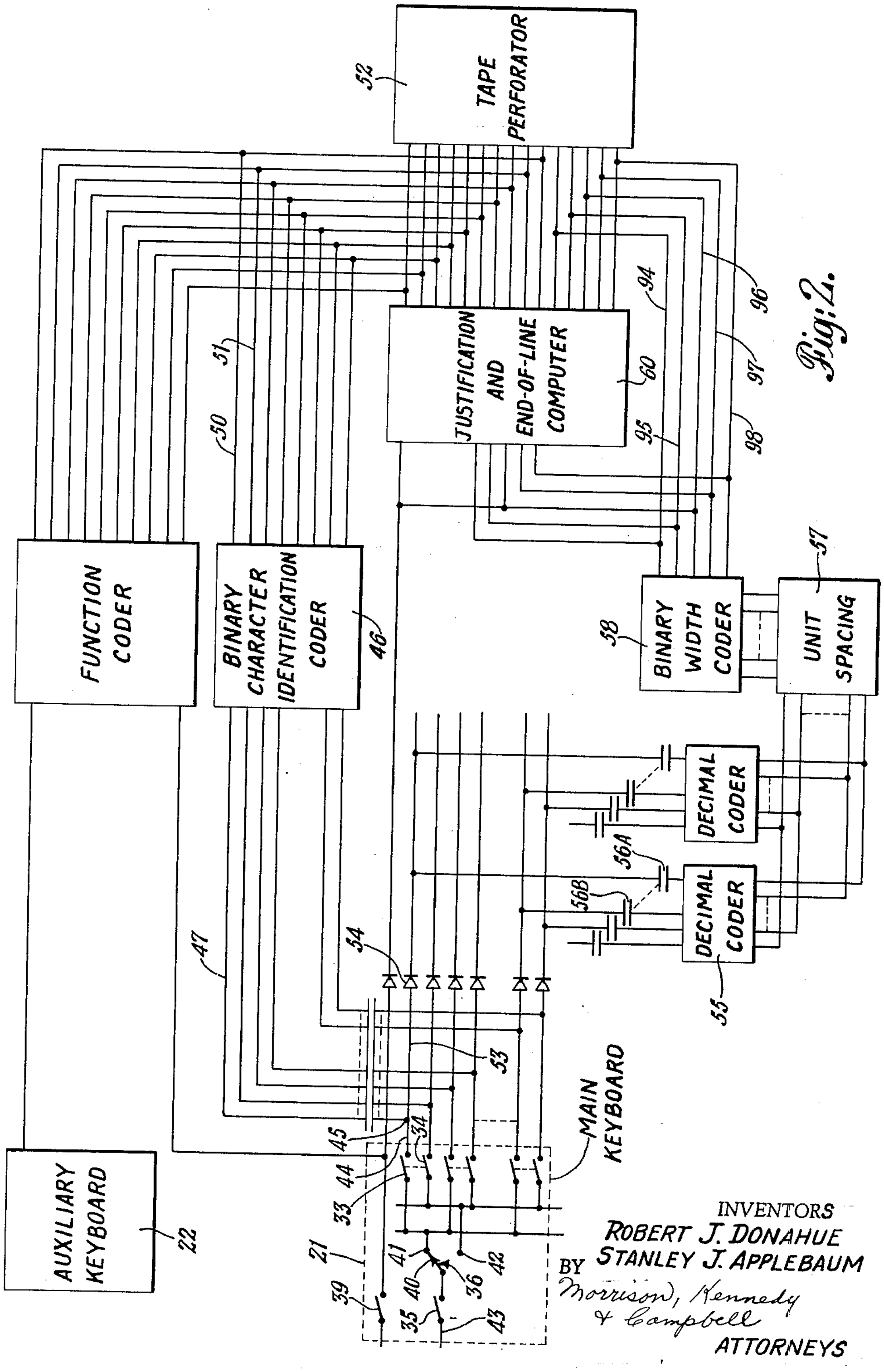
FIG. 2 is a schematic circuit diagram in block form showing the signal circuitry of the tape producing machine.

Attention will now be directed to the width information coding circuits. Referring to FIG. 2, depression of a character key on the typewriter resulted in the completion of a circuit to conductor 44, which divided into conductor 47 (leading to the character identification circuits) and conductor 53 which leads to the character width circuits now to be considered.

Conductor 53 immediately leads to a reverse current limiting device or rectifier 54 and thereafter to decimal coder 55 through font selector contacts 56A, 56B etc. It will be noted that a plurality of decimal coders are provided, only one of which will be in use at any one time. The purpose of this arrangement is to permit the mixing of type face styles with facility and automatically in response to font selection push-buttons on the auxiliary keyboard 23. Depression of such a push-button will cause the engagement of a group of contacts e.g. 56A, 56B, etc. that will connect only a single decimal coder 55 to the character key contacts 33, 34 etc. As in the case of the keyboard circuits, reference may be had to Patent No. 2,848,049 for a full description of the decimal coder circuits as well as the unit spacing circuit 57 and the binary width coder circuits 58. The width information for a character after conversion to binary form is transmitted to the perforator 52 where it controls the energization of solenoids distinct from those that code the character identification signals on the control tape. In this manner, the character width information or signal can be coded on the control tape adjacent the character identification signal, thereby forming a two part signal representative of the identity and width of a selected character. Thus, each time a character key is depressed a signal corresponding thereto is entered on the control tape.

As composition of a line of text proceeds, information for each character in the line is coded on the control tape as indicated above, as is a signal for each interword space in the line. In addition to the information regarding each character, however, it will be necessary for the control tape to include code information as to how the line is to be photographed. That is, should the line be quadded left, quadded right, centered or justified? Also, the tape must contain code information to permit the carrying out of the desired composing operation. For example, if the line is to be justified, code information is provided which when decoded in the photographic unit will control the interword spacing to justify the line. If the line is to be quadded left, the control tape is coded so that normal interword spacing is effected during the photographing of the line in the photographic unit. If the line is to be quadded right, code information is provided on the tape which will allow the photographic unit to traverse a portion of the film before photography of the line takes place, to assure that after providing the proper amount of white space preceding the line, the last character of the line will coincide with the right-hand margin. On the other hand, if the line is to be centered, the code information controls photography of the line so that the white space between the left-hand margin and the first character equals, or approximately equals, the white space between the terminal character and the right-hand margin. The requisite code information is received from the electronic computing device 60, which is the subject of this invention.

However, before describing the particular mechanisms, it is believed worth while to review the fundamentals of the unit system for character widths. In such a system, the typographical "em" is divided into a discrete number of units, for example, eighteen units as in the present apparatus, and each unit will be one-eighteenth of an em in width. The characters will be assigned widths measured on such units. Thus, the upper case "A" may have a width of nine units, while the lower case "r" may have a width of four units, and the upper case "W" may have a width of eighteen units. Of course, the width of a particular character may vary from one type face style to another, hence the provision of a plurality of decimal coders for different fonts of type. But in any event, the width will still be based on the same unit system. Even the normal interword space is assigned a width measured in units-of-an-em. For ordinary composition, the interword space is taken as four units.

Since each character and each interword space which goes to make up a line of composition has a width of a fixed number of units, it is possible to total the units in any line of composition. Furthermore, it is known, when doing composing work, that a full justified line will be of a predetermined length measured in ems and units-of-an-em. Therefore, apparatus can be provided which, as a line is composed, subtracts the number of units in each character and space of the line from the predetermined justified line length. In general, when composition of the line is completed, the number of units taken up by the characters and word spaces will not equal the number of units in the full line, with the result that there is a line remainder of the excess units. Apparatus is therefore provided which will divide the line remainder by the number of interword spaces in the composed line to give a justification increment which must be added to each normal interword space to expand the line to its full or justified length. The line remainder information may also be used to provide quad right information. In this case the line remainder is placed at the beginning of a line in the photographic unit. The line remainder may also be divided in half so that the composed line can be centered when photographed. Selection of the form in which the line remainder information is provided by the computer and coded on the control tape is under the control of the operator who by the operation of the proper function keys, will determine whether the composed line is to be quadded left, centered, quadded right, or justified.

Figure 6:
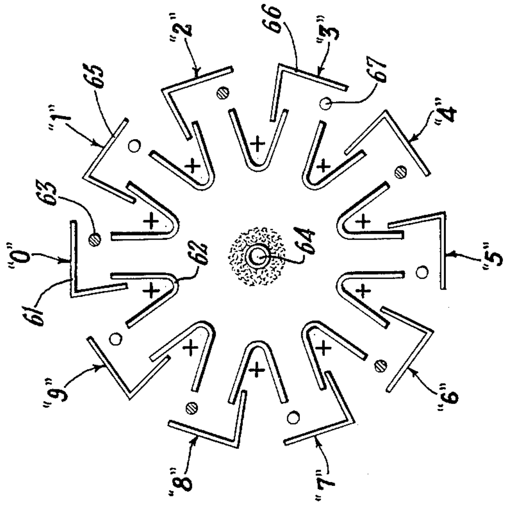
FIG. 6 is a schematic representation of a magnetron beam switching tube that is utilized in the line length indicator mechanism.

The width information representative of a character key, in addition to being transmitted from the width binary circuit to the perforator for coding on the control tape, is transmitted to the line length indicator and the justification computer now to be described. However, before describing the circuits which go to make up the present invention, attention is directed to FIG. 6 which schematically shows a magnetron beam switching tube employed in the circuits. The tube may be a Burroughs Corporation magnetron beam switching tube, type 6700. The tube has ten groups of elements, each comprising a target 61, a spade 62, and a switching grid 63, arranged radially about a central cathode 64. An axial magnetic field is provided by a permanent magnet attached to the tube envelope. If the targets are numbered from 0 to 9, as shown, the switching grids associated with the evenly numbered targets are termed "even grids" while the remaining grids are termed "odd grids." Under proper operating conditions, if a beam is formed between the central cathode 64 and an evenly numbered target e.g. 61, a negative pulse on the associated even switching grid 63 will cause the beam to shift to the next leading odd numbered target 65. In a similar manner, if the beam is formed between the centeral cathode 64 and an odd numbered target e.g. 66, a negative pulse on the associated odd switching grid 67 will cause the beam to shift to the next leading even numbered target. Of course, when the beam is switched to a target, the target voltage abruptly changes and this effect is utilized to perform a control function.

Figure 3:
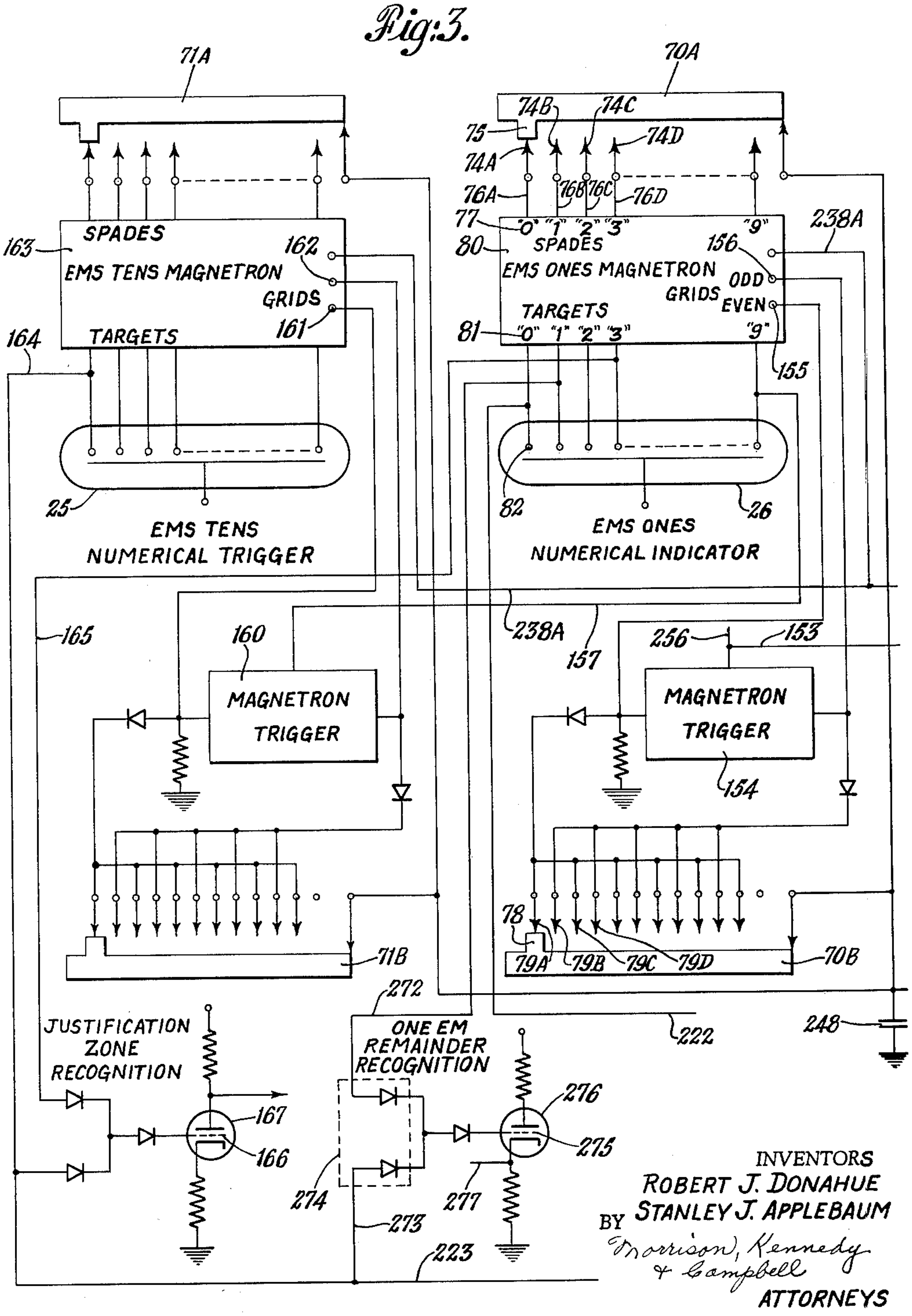
FIGS. 3 and 4 are portions of a schematic circuit diagram in block form showing particularly the line length setting mechanism.
Figure 4:
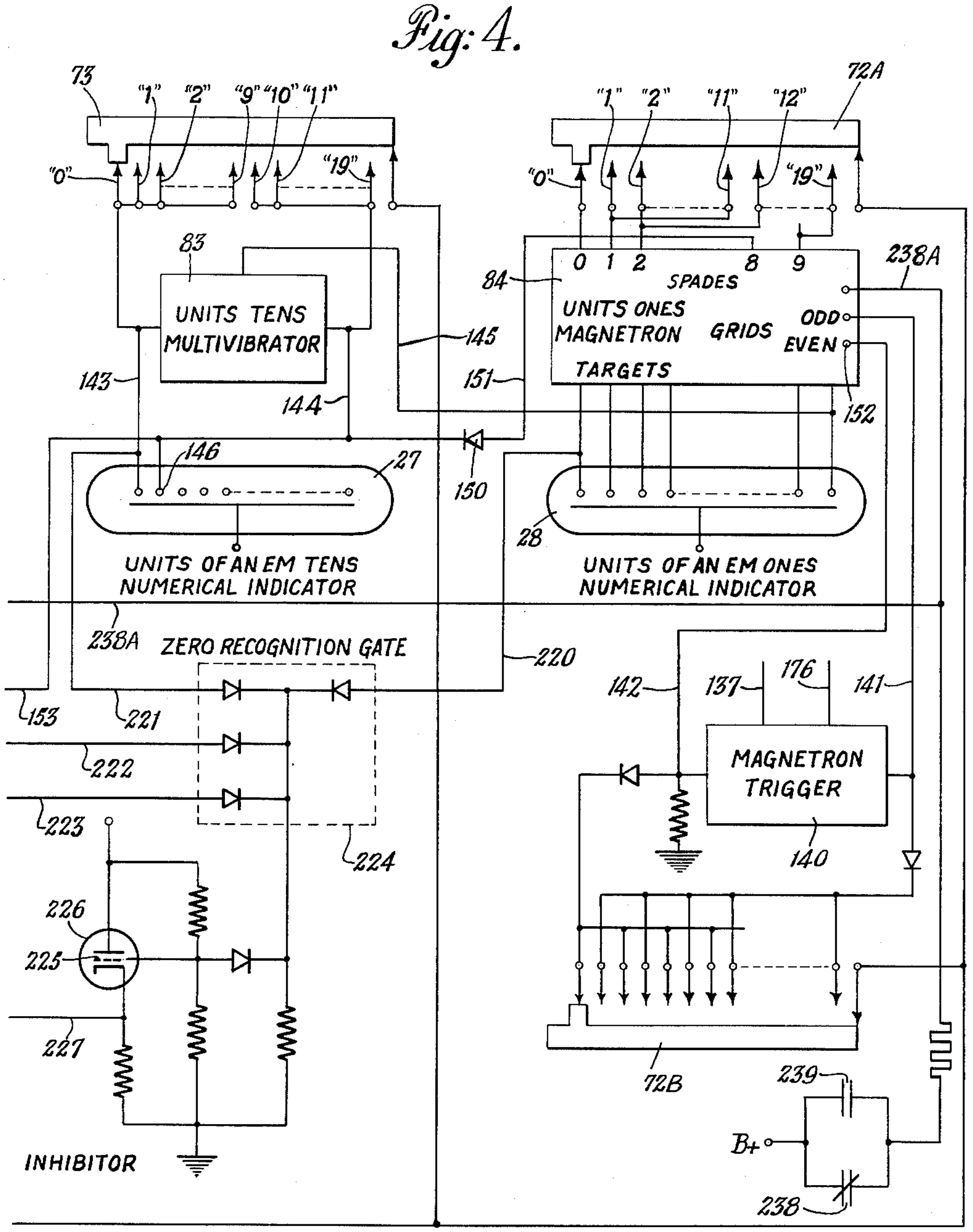

Turning now to FIGS. 3 and 4, which schematically show the line length setting circuitry, the ems ones setting knob 31 is attached to the rotary switch contact device 70A and 70B, and the ems tens setting knob 30 is connected to the rotary switching device 71A and 71B, and together the knobs set the electronic circuitry for the ems line length. Thus it is clear that the line length in ems is set by actuating knobs 30 and 31. In a similar way, the units-of-an-em knob 32 actuates the rotary switching contact device 72A and 72B, which sets the electronic circuitry for the units-of-an-em ones line length, as well as the rotary switching contact device 73, which sets the electronic circuitry for the units-of-an-em tens line length.

Since the contact devices 70A, 70B and 71A, 71B are similar in construction and function, attention is directed to device 70A and 70B for elaboration. This device is seen to consist of a series of stationary contacts 74A, 74B, etc. that are successively contacted by a conducting member 75 which is rotated by knob 31. The purpose of the switching operations is to place the proper control voltage on one of the contacts 74 and through one of the electric conductors 76A, 76B, etc., to a selected spade 77 of the beam switching magnetron 80. With the control voltage on spade 77, the electron beam is formed between the central cathode of the tube and the target 81 associated with that spade. An output voltage is thus made available to a selected cathode 82 of the ems-units numerical indicator tube 26. Each cathode of tube 26 is, of course, connected by a conductor to an associated target of the magnetron 80. The indicator tube, therefore, is energized with the selected numeral illuminated. Device 70B is similarly actuated so that contact 78 will engage one of contacts 79A, 79B, 79C, etc. It will be observed that alternate contacts are electrically connected together and go to condition magnetron trigger 154, which is a bistable multivibrator, in either of its two stable states depending on whether device 70A, 70B is actuated to energize an even or an odd numbered target in magnetron 80. The reason for so conditioning trigger 154 is that if the magnetron is initially set with the electron beam formed between the cathode and an even target, the first switching pulse must cause the even grid 155 to go negative. On the other hand, if the magnetron is initially set so that the electron beam is formed between the cathode and an odd numbered target, the trigger 154 must be conditioned so that the first switching pulse transmitted over conductor 153 or 256 causes a negative pulse to be applied to the odd grid 156. In a similar way, a selected numeral is illuminated in the ems-tens numerical indicator tube 25, so that the two tubes 25 and 26 in conjunction indicate the desired line length in ems.

The units-of-an-em ones line length is set and indicated in a similar way in the tube 28 by the units-of-an-em ones setting knob 32. However, if we assume that the typographical character width system is based on eighteen units to an em, it is clear that the units-of-an-em tens digit will be either zero or one. Since it is not necessary to illuminate the numerals from two to nine for the units-of-an-em tens indication but only one or zero, a beam switching magnetron is not employed in this circuit. Rather a conventional bistable multivibrator or "flip-flop" 83 is used. In one stable state of operation, a proper control voltage is available to illuminate the "1" cathode in numerical indicator tube 27, while in the other stable operating state a voltage is available to illuminate the "0" cathode. Of course, illumination of the numeral "0" can, if desired, be avoided in the tens tubes so that when there are zero tens in the numerical indication, the tubes 25 and 27 will be dark.

It will be noted that the contact device 72A, 72B, connected to the units-of-an-em setting knob 32 is a 19 position rotary switch so that in the units-of-an-em tens portion of the circuit, the stationary contacts of switch device 73 are connected in two groups, the first of which includes contacts "0" to "9" while the second group includes contacts "11" to "19." Since the units-of-an-em tens value of the first group is zero, the contacts therein are connected to multivibrator 83 and to indicator tube 27 in such manner as to give a zero reading in tube 27. The contacts in the second group are connected to give a "1" reading in tube 27. In the units-of-an-em units portion of the circuit, contacts "0" and "10" of switching device 72A are connected to the zero spade of magnetron 84. Similarly contacts "1" and "11," "2" and "12," etc. are connected to spades 1, 2 etc. of the magnetron.

Having described how the line length is preset and indicated, it remains to be described how the numerical indication is decreased as a line is keyboarded. Inasmuch as the numerical indication given by the indicator device after initial setting represents the justified line length, any decrease in the numerical indication due to the subtraction therefrom of individual character widths means that the indicator device will indicate line remainder or the available space remaining in a line. The remaining space may be filled with characters as in a justified line, or it may appear as white space as in quadded or centered lines.

When a character key or the space bar of the typewriter 21 is depressed, universal contacts 35 (FIG. 5) engage to trigger the "one shot" multivibrator 85 and thereby generate a positive pulse for conduction over lead 86. The capacitor 87 passes only a negative spike to the grid of a second "one shot" multivibrator 90, and it in turn generates a negative pulse which is transmitted over conductor 89 to the grid 91 of cathode follower 92, causing the tube to conduct. A positive pulse is thereby developed and transmitted over lead 93 to the shift switch 36 and through a character key contact, e.g. 33, to the character identification and width coder circuits, respectively, and from there to the tape perforator where a character identification and character width signal is produced as previously described. Of course, if the tape is to be used to control operation of a linecasting machine, it could be perforated according to the Teletypesetter code. However, in such case it is not necessary to code character width.

The pulse passing through the character key contacts, in addition to being transmitted to the character identification and width coder circuits to be recorded on the control tape, is transmitted, after being converted to binary form, to the computer and line length indicator circuits. If any one or group of the binary leads 94, 95, 96, 97 and 98 (representing character widths and corresponding to the binary values 1, 2, 4, 8, and 16 respectively) are energized, a positive voltage is impressed on the corresponding grids of the rightward tubes 100, 101, 102, 103 and 104 of the twin triodes illustrated. These tubes are connected as cathode followers. Each tube which has its grid pulsed will fire, thereby causing the cathode voltage to rise. If we consider these tubes to have binary values of 1, 2, 4, 8 and 16 (reading from top to bottom on the drawing), then we might say that the tubes which represent the width of the character, the finger key for which was depressed, are caused to conduct and the cathode voltages thereof raised. Since the cathode of each tube is connected directly to the cathode of the associated twin tube, the cathode voltage of the twin tube also is raised, but not enough to cause the twin tube to conduct. Of course, if a tube is not fired its cathode voltage remains at the initially set value. The tubes which are not fired represent in binary value the complement of the width value of the character, the finger key for which was depressed, that is, the complement so far as the capacity of the binary counter 111 is concerned.

Thus the pulse path so far traced for a character key may be said to condition the binary counter 111 for subsequent operations. The monostable multivibrator 90 which generated the pulse for transmission to cathode follower 92 also generates a pulse which trips multivibrator 112 and in turn generates a pulse for transmission over lead 113. This pulse (which might be termed a timing pulse) lags, in time, the pulse over lead 89 that conditioned twin triodes 100, 101 etc. The pulse is delivered to the grids of the tubes 114, 115, 116, 117 and 118 which are paired with tubes 100, 101, 102, 103 and 104 respectively. If the cathode voltage had been previously raised by the conduction in one or more of tubes 100, 101, etc., the associated tube will not fire. However, if the cathode voltage had not been raised by a pulse over the binary leads 94, 95, etc., the timing pulse will cause conduction in the associated tube to cause a voltage drop across resistor 120, 121, etc., of sufficient magnitude to effect transmission of a negative pulse over leads 105, 106, 107, 108 or 109 to the associated stages of the binary counter 111, thereby causing that stage to go to its "one" or counting state. Thus, the timing pulse causes a count to be introduced into the counter which equals the complement of the width of the character, the finger key for which was depressed to initiate the present train of operations. The complement is, as noted hereinbefore, equal to the capacity of the counter minus the width of the character. Therefore, assuming the input to the counter to be a train of pulses, when the number of pulses transmitted to the counter equals the width value of the character all the stages of the counter will be in their "one" or counting condition.

The single pulse transmitted from monostable multivibrator 90 over lead 89, in addition to firing the cathode follower 92, also is transmitted by way of diode 125 and capacitor 126 to the counter input lead 127. The pulse lags in time the timing pulse so that it adds one to the count initially placed in the counter and the operation thereof is modified so that when a number of pulses equal to the width of a character are introduced into the counter, an output pulse is generated, and the counter will be reset to zero count in preparation for introduction of width information for a subsequent character.

The pulse generated by the monostable multivibrator 90 is also transmitted by way of diode 130 and capacitor 131 to the bistable multivibrator oscillator gate 132 which produces an output pulse that triggers tube 133 of oscillator 134. The oscillator will start and continue to produce pulses which are transmitted to the counter 111 over lead 135, until it is shut off. This is effected by the counter output pulse which is transmitted by conductor 136 to close gate 132 and stop operation of the oscillator 134, as by impressing a negative bias on the grid of tube 133. It is thus obvious that the oscillator generates a number of pulses equal to the width of a keyboarded character. Quite apparently, in composing a line, the oscillator will generate a total number of pulses equal to the cumulative widths of the characters that go to make up the line, but the pulses will be generated in groups of pulses depending on the widths of the individual characters in line.

As shown in FIG. 4, the pulses generated by the oscillator are transmitted by way of conductor 137 to the magnetron trigger 140 associated with the units-of-an-em ones magnetron 84 and numerical indicator tube 28. The trigger 140 is a bistable multivibrator having the plates of its electron tubes connected by leads 141 and 142 to the odd and even grids, respectively, of magnetron 84. The initial setting of switch 72B has, of course, determined the initial stable state of trigger 140, so that if the numerical indicator tube initially shows an odd numeral (and the electron beam in the associated magnetron tube is between the cathode and an odd numbered target) the trigger will be oriented so that a bias is on the even grids. Consequently, when a pulse is next transmitted to it, trigger 140 will change its state and thereby put a negative bias on the odd grids to switch the magnetron beam from the odd numbered target to the even numbered target adjacent thereto. Of course, if the initial setting had been such that the numerical indicator tube 28 showed an "even" numeral, the initial pulse from oscillator 134 to trigger 140 will impress a negative bias on the even grids to switch the electron beam from the even numbered target to an odd numbered target. It is readily apparent, then, that a train of pulses introduced to trigger 140 from oscillator 134 will cause the trigger to flip-flop from one stable state to the other and that consequently the electron beam in magnetron 84 will switch successively, in one direction, from one target to the next adjacent one. By way of example, if the units-of-an-em ones magnetron 84 was initially set so that the associated numerical indicator tube 28 illuminated the numeral seven (7) and it is assumed that a character having a width of five units is keyboarded, a train of five pulses will be generated by oscillator 134 as hereinabove described. The five pulses will be introduced into trigger 140 to change its stable state five times and thereby transmit five pulses alternately to the magnetron odd and even grids. As a result, the electron beam will switch from the number seven target to the number two target, and the numerical indicator tube will thereupon show the numeral "2." As the electron beam in magnetron 84 switches from target seven to target six, etc., the cathodes seven, six, etc., of the indicator tube 28 will be energized and thus illuminated. However, the switching rate of the electron beam is so high that the instantaneous illumination of the intermediate numerals is not apparent to a viewer's eye, and only the numeral associated with the magnetron target at which the electron beam finally stops will be illuminated for observation.

The generation of a train of pulses corresponding in number to the widths of the characters keyboarded has been explained and so far as the indicating function is concerned it remains only to be shown how the operation of the four numerical indicator tubes 25, 26, 27 and 28 is coordinated so that the tubes, as a group, give a running indication of the line remainder as a line is keyboarded.

It will be observed by reference to FIG. 4 that the pulses generated by oscillator 134 are transmitted only to trigger 140 which is associated with the units-of-an-em ones magnetron 84. That this should be so is rather obvious in view of the fact that in all instances the widths of characters are coded as units-of-an-em and it is the individual character widths which are continually subtracted from the line remainder.

Inasmuch as the typography of the photocomposing machine for which the present apparatus is provided is based on an eighteen (18) unit em, it is clear that, as hereinbefore stated, the units-of-an-em tens numeral will be either zero or one. For that reason, a bistable multivibrator 83 was provided to control the units-of-an-em numerical indicator tube 27 rather than a beam switching magnetron. One stable state of operation of the multivibrator represents that the units-of-an-em tens is equal to zero and consequently the multivibrator 83 is connected to the "zero" cathode of indicator tube 27 as by conductor 143. The "one" cathode of tube 27 is connected to multivibrator 83 by conductor 144 and is energized when the multivibrator is in its other stable state of operation.

The input lead 145 which triggers the multivibrator 83 from one stable state to the other is shown to be connected to the number nine target of the units-of-an-em ones magnetron 84. Consequently, each time that the electron beam of magnetron 84 extends from the cathode to target nine, either transiently or at the end of a train of oscillator pulses, the multivibrator is triggered to its other stable state. For example, if the multivibrator is conditioned to give a numerical indication of one, as when the units-of-an-em line remainder is fifteen (15), and we assume that a character having a width of six units is keyboarded, then the electron beam in the units-of-an-em will have to be switched from the number five target to the number four target, etc. When the beam reaches the number nine target (after six switching operations corresponding to the six unit character and the six oscillator pulses generated in accordance therewith) a pulse is transmitted over lead 145 to trigger the units-of-an-em tens multivibrator 83 and cause it to go from its original (i.e. "one") stable state to its other (i.e. "zero") state. Consequently, the indicator tube 27 has its "zero" cathode illuminated. As mentioned previously, the conductor to the "zero" cathode may be omitted with the result that a "zero" indication is not given. Considering the indicator tubes 27 and 28, tube 27 has its zero cathode illuminated and tube 28 has its nine cathode illuminated. The ems line remainder has not been considered yet, so that considering only tubes 27 and 28, the units-of-an-em line remainder is nine.

The electron beam in magnetron 84 will continue to switch from target to target in response to pulses from the oscillator and we will assume that such switching continues until the beam is switched to the zero numbered target, thereby indicating a units-of-an-em line remainder of zero. If we now assume that a single pulse is introduced into the magnetron trigger 140 so as to deliver a negative pulse over conductor 142 to the even grid of magnetron 84, the beam will be switched from the zero numbered target to the nine numbered target. As a result thereof, the input lead 145 to units-of-an-em tens multivibrator 83 is pulsed to change the state of operation, of the multivibrator so as to produce a negative pulse on cathode 146 of indicator tube 27. This cathode is the numeral "1" and is illuminated. The negative pulse is also transmitted through diode 150 and over lead 151 to the number eight spade of magnetron 84. This negative pulsing of the number nine target is sufficient to transfer the electron beam from the number nine target to the number eight target. The negative bias on the even grid 152, which was effective to transfer the electron beam from the number zero target to the number nine target, is still present on grid 152 and consequently the electron beam is transferred from target eight to target seven. The effect of the single pulse was to transfer the electron beam from the zero target of magnetron 84 to the number seven target. This high speed switching from the number zero target to the number seven target in response to a single pulse only takes place when the units-of-an-em tens multivibrator goes from its "zero" indicating to its "one" indicating state of operation. The reason for so switching the electron beam is found in the fact that the typographical em in applicants' system is divided into eighteen units. Consequently, if one unit is subtracted from a "X" ems, "0" units-of-an-em line remainder, the new line remainder will be "X–1" ems, "17" units-of-an-em.

If the electron beam in units-of-an-em ones magnetron 84 is on the zero target and a single pulse is transmitted to trigger multivibrator 140 and as a result of the transfer of the beam to the number nine target, units-of-an-em tens multivibrator 83 is switched from its "one" indicating state to its "zero" indicating state, the beam will remain on target nine of magnetron 84. On the other hand, if as a result of the transfer of the beam to the number nine target, the units-of-an-em tens multivibrator is switched from its "zero" indicating state to its "one" indicating state, the beam will be switched to the number eight target and then to the number seven target as above described. The fact that multivibrator 83 is switching from its zero to its one indicating state is monitored by the transmission of a negative pulse over conductor 151. The pulse is applied to the number eight spade of magnetron 84 and is equally effective in shifting the electron beam as is a pulse on a switching grid.

As the units-of-an-em tens multivibrator is switched from its "zero" indicating state to its "one" indicating state, a negative pulse is transmitted over lead 153 to the magnetron trigger 154 (FIG. 3). This circuit element is a bistable multivibrator and as it is triggered it delivers a pulse to either the even grids 155 or the odd grids 156 of the ems units magnetron 80, depending on whether the electron beam is to be switched from an even to an odd grid or from an odd to an even grid, respectively.

The electron beam in the ems units magnetron will be stepped from one target to the next adjacent target each time units-of-an-em tens multivibrator 83 is switched from its "zero" indicating state to its "one" indicating state.

Of course, the targets of magnetron 80 are connected to the cathodes 82 of numerical indicator tube 26 which gives a visual indication of the ems ones line remainder.

Each time the electron beam in magnetron 80 is switched from the number zero target to the number nine target, a negative pulse is transmitted over conductor 157 to the magnetron trigger 160. This also is a bistable multivibrator and, as it is triggered, it delivers a pulse to either the even grid 161 or the odd grid 162 of the ems tens magnetron 163, depending on whether the electron beam is to be switched from an even to an odd grid or from an odd to an even grid, respectively.

It is apparent from what has been stated that, as the pulses from oscillator 134 are delivered over lead 137 to trigger 140, their effect is to switch the electron beam in magnetron 84 from target to target, and to periodically trigger the units-of-an-em tens multivibrator 83 so that a visual indication of the units-of-an em line remainder is continually observable in numerical indicator tubes 28 and 27 controlled by magnetron 84 and multivibrator 83, respectively. As the units-of-an-em line remainder count goes from zero to seventeen, the magnetron 80 which controls the ems ones indication is caused to switch its electron beam from one target to the next adjacent target representing the next lower level. Of course, as the ems ones magnetron beam is switched from the zero target to the nine target, a pulse is generated which switches the electron beam in the ems tens magnetron 163 to the next adjacent target representing the next lower numeral. Thus a visual indication of line remainder in ems and units-of-an-em is available to the operator of the keyboard unit.

When the ems tens remainder falls to zero, as indicated by a negative bias on conductor 164, the ems units remainder falls to three, as indicated by a negative bias on conductor 165, the voltage on grid 166 of electron tube 167 is reduced below cut-off value so that conduction in the tube is interrupted. The resulting rise in the plate voltage is utilized to energize a relay and give an audio and/or visual signal to the keyboard operator that the justification zone was reached. Thus the justification zone is reached when the line remainder falls to three ems, regardless of the number of units-of-an-em line remainder. Therefore, the full justification zone is three ems, seventeen units-of-an-em. Of course, the justification zone may be varied as desired.

After the justification zone has been reached in the composing operation, as indicated to the keyboard operator, the operator may depress the justification button to compute and record the justification answer for the composed line. Actuation of the justification button completes a circuit to engage contacts 170 (FIG. 5) and thereby generate a pulse that triggers the oscillator gate 132. The triggering of the oscillator gate causes oscillator 134 to start generating a train of pulses that will be utilized to compute the justification answer. The pulses are not transmitted to the character width counter 111 because contacts 171 engage when the justification button is depressed and short circuit the counter.

Pulses from the oscillator, however, are transmitted to the scale binary bistable multivibrator 172 (FIG. 8) which, during justification computation, is conditioned by contacts 173 so that each pulse transmitted over conductor 174 is delivered through "and" diode gate 168 and conductor 169 to the pulse shaper 175. This latter component is simply a monostable multivibrator. From the pulse shaper 175 the pulse is transmitted along two paths; one, over conductor 176 to the trigger 140 for units-of-an-em ones magnetron 84. During justification computing, conductor 137 is interrupted by the separation of contacts 177. The pulses generated during an end of line sequence, of course, actuate the line length indicator in the same manner as the pulses generated during keyboarding of the line. Thus, the line remainder indicated by the tubes will continue to be reduced during the justification computation. The reason for this will be apparent from the further description of the apparatus.

Figure 9:
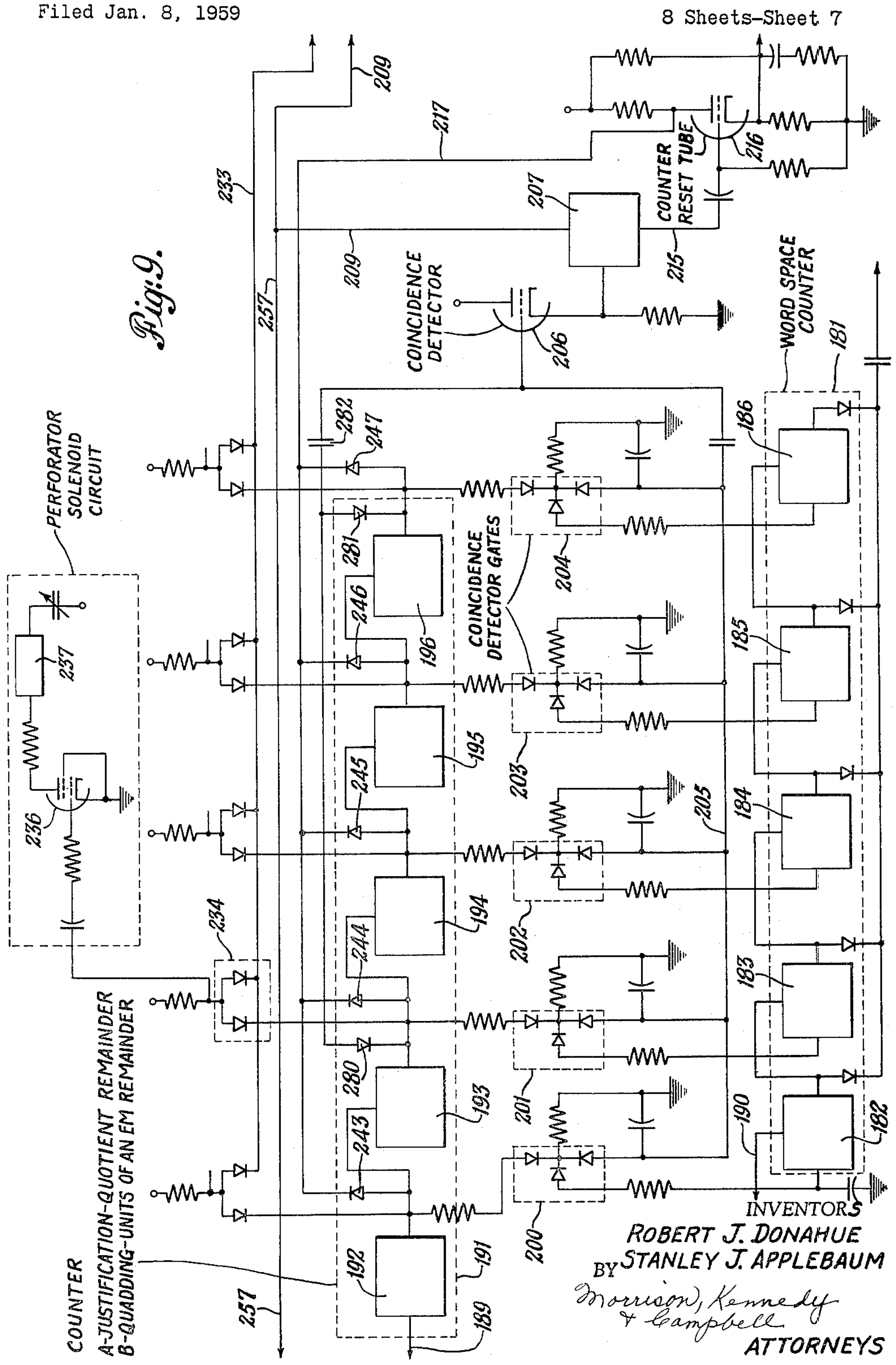

The pulses emanating from pulse shaper 175 are also transmitted to the computing circuits proper through a cathode follower 180. The computer circuits include an interword space counter 181 which comprises a five stage binary counter, preferably of the electronic type employing bistable multivibrators, 182, 183, 184, 185 and 186 (FIG. 9). During keyboarding of a line, each time the space key 187 is depressed a pulse is delivered over conductor 190 to be registered in the counter. Therefore, when the justification computation is initiated, the interword space counter has registered therein the number of word spaces among which the line remainder must be divided.

Figure 10:
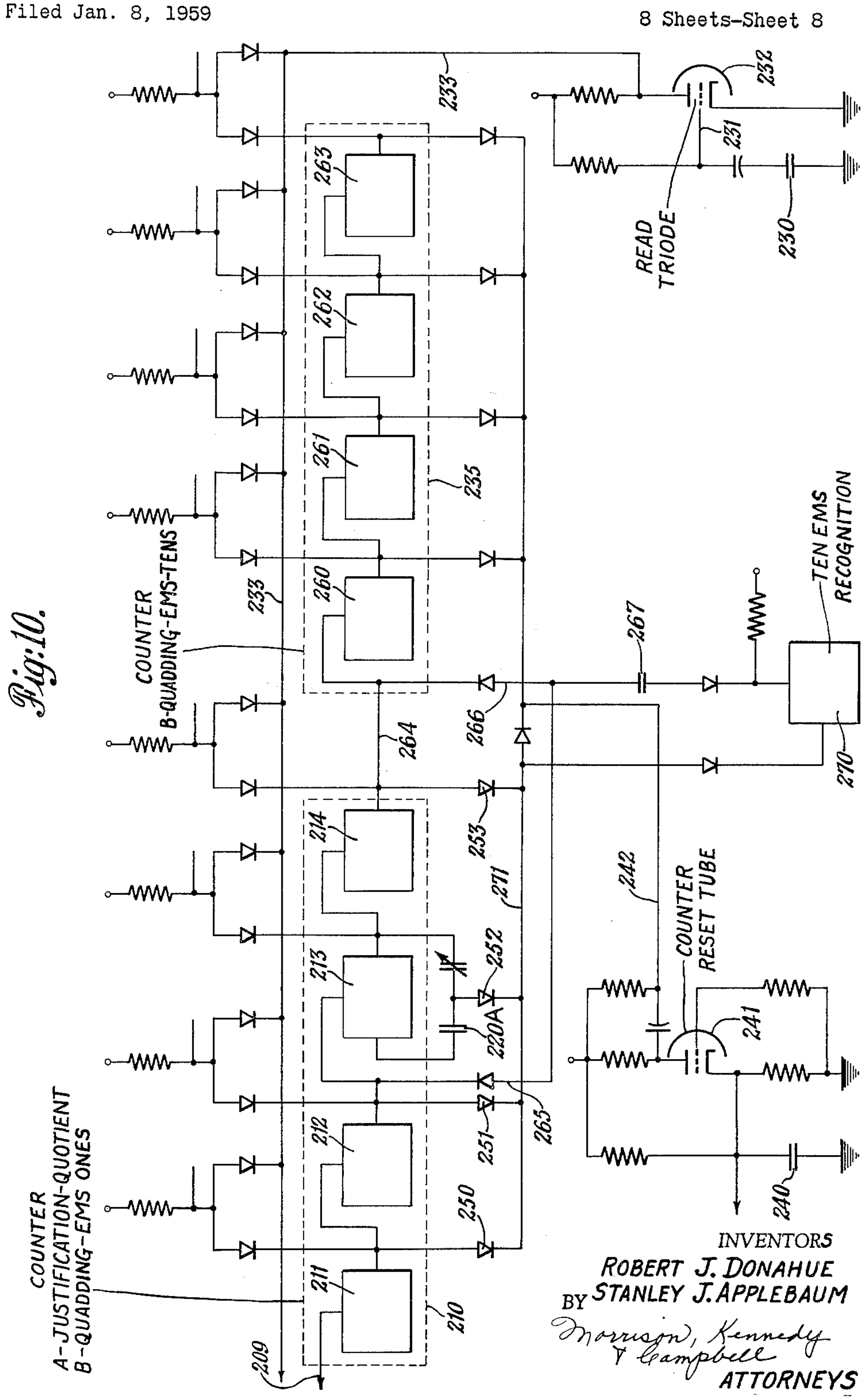

The pulses which originate in the oscillator 134 and which are transmitted to the computing circuits also go to a binary counter 191 which comprises a number of stages 192, 193, 194, 195 and 196 equal to the number of stages (five) in the interword space counter 181 (FIG. 9). When the number of pulses that are delivered to counter 191 by way of conductor 189 from cathode follower 180 equal the number of spaces that are in the composed line and hence the number stored in the interword space counter 181, there is coincidence between the two counters. This simply means that both counters are in the same state or condition, with corresponding stages in the actuated or quiescent state as the case may be. The coincidence between corresponding stages of the counters is detected by means of diode "and" gates 200, 201, 202, 203 and 204 which monitor circuit conditions in the conventional manner. When there is coincidence in the two counters, a positive pulse is developed and transmitted over conductor 205 to fire coincidence detector triode 206. A pulse therefrom is transmitted to the "one shot" monostable multivibrator 207 and from there along two paths. In the first instance, the coincidence pulse is transmitted by conductor 209 to and stored in binary counter 210 which comprises four stages 211, 212, 213 and 214 of bistable multivibrators (FIG. 10). The pulse is also transmitted by lead 215 to reset triode 216 (FIG. 9) which generates a pulse which is transmitted over conductor 217 to reset the pulse counter 191. The pulses generated by oscillator 134, however, continue to be delivered to counter 191 so that the operation just described is repeated. Thus each time the number of pulses delivered to counter 191 coincides with the number of spaces in the line as registered in space counter 181, a pulse is delivered to and stored in counter 210. It might be noted here that at the start of the justification computation, an initial count of four is introduced into counter 210. This count of four equals the number of units-of-an-em in a normal interword space and is introduced into the binary-form stage 213 by the engagement of contacts 220A. By so doing, the quotient answer obtained from counter 210 will represent a full justified word space rather than a justification increment that must be added to a normal word space.

The operation continues as described until the magnetrons 163, 80 and 84 and the multivibrator 83 reach the state where they represent zero ems and zero units-of-an-em remainder. This information is monitored by conductors 220, 221, 222 and 223 leading from the zero numbered targets of the magnetrons and the zero indicating plate of the multivibrator. The conductors are connected through an "and" diode gate 224 to the grid 225 of an inhibitor triode tube 226 that had been conducting (FIG. 4). The tube is extinguished and consequently a negative pulse is delivered over the cathode lead 227 to the oscillator gate 132. The gate 132 is switched over to its other stable operating state and the oscillator 134 is thereby shut off. Therefore, the oscillator has delivered a number of pulses equal to the line deficit in units-of-an-em. The pulses have been delivered to counter 191 that is connected by way of a coincidence circuit to an interword space counter 181 wherein is registered the number of spaces in the line to be justified. Each time coincidence between the counter 191 and the space counter 181 occurs, a pulse is delivered to the third (ems units) counter 210.

If a specific example is considered, the significance of the pulse storage will be better appreciated. If we assume a line deficit of twenty-six units-of-an-em in a line that contains four interword spaces, it is obvious that the twenty-six units-of-an-em must be divided among the four interword spaces. In doing this, there is obtained a quotient of six and a quotient remainder of two. For an explanation of these terms having regard to photocomposing, and particularly to a photocomposing machine employing a units-of-an-em system of typography, see the aforementioned Patents Nos. 2,816,609 and 2,848,049. Furthermore, since a normal interword space width of four units was introduced to the indicator mechanism for each interword space during keyboarding of the line, the value "four" must be added to the quotient, as above defined, in order to provide a justified word space. If the normal word space width is not added to the quotient value, then the quotient is equal to the justification increment rather than the full justified word space. However, in a photographic unit, such as one of the type described in aforementioned application Serial No. 696,448, it has been found more desirable to code the full justified word space. The normal word space width is added to counter 210 before the justification answer is computed as above described.

In the example set forth, a count of four would be registered in the space counter 181 as the line is keyboarded. Thereafter, when the justification button is depressed, the oscillator begins to generate pulses which are delivered to counter 191. When the fourth pulse is delivered to counter 191, there is a coincidence between the count therein and the count in space counter 181, so that a pulse is generated by the coincidence detector tube 206 and transmitted to the ems unit counter 210. The same thing happens upon delivery of the eighth, twelfth, sixteenth, twentieth, and twenty-fourth pulses, with the result that a total of six pulses are delivered to counter 210. Since the counter had an initial count of four therein (the normal word space width), after the transmission of the six pulses from coincidence detector tube 206, a total count of ten will be stored in counter 210. This, of course, means that the second 212 (binary 2) and fourth 214 (binary 8) stages of the counter are in their operative or counting states.

The twenty-fifth pulse and the twenty-sixth pulse are delivered to counter 191 but no more since the oscillator will have been turned off as above described. Since only two pulses were delivered to counter 191, only the second stage 193 (binary 2) will be in its operative state. At this point, the justification answer, both quotient (the justification increment plus the normal word space) and quotient remainder are registered in binary form in counters 210 and 191, respectively. Thereafter a contact 230 (FIG. 10) is engaged to effectively ground the grid 231 of tube 232 and thereby interrupt conduction in the tube. The resulting rise in the plate voltage produces a positive pulse that is applied to conductor 233 and through it to one branch of an "and" diode gate circuit 234 connected to each stage of each counter 191, 210 and 235 (FIG. 9). Consequently, if a stage of a counter is operative (i.e. in the counting state) a pulse is transmitted by the gate to a perforator thyratron tube, e.g. 236 (although a thyratron tube and a perforator solenoid will be provided for each stage of each counter, only one perforator thyratron and the associated perforator solenoid are shown in order to simplify the diagram) which thereupon fires to energize a perforator solenoid, e.g. 237, which in turn causes the control tape to be perforated in accordance with the justification answer stored in the counters 191 and 210.

After the justification answer is coded on the control tape, a circuit is closed to engage contacts 240 (FIG. 10). Engagement of these contacts causes tubes 241 and 216 to conduct, thereby lowering the plate potentials and sending negative pulses over conductors 242 and 217 to reset the various counters to their normal or "no count" state preparatory to the keyboarding of the next line. Counter 191 is reset through diodes 243, 244, 245, 246 and 247, while counter 210 is reset through diodes 250, 251, 252 and 253.

Furthermore, after the end of line signal and answer is coded, such as just described for the justification answer, the apparatus is reset preparatory to the keyboarding of a subsequent line of composition. This simply requires that the line length mechanism, that is, magnetrons 80, 84 and 163 and multivibrator 83, be reset to the condition prescribed by the setting of knobs 30, 31 and 32 and the associated contact devices 70A, 70B, and 71A, 71B, and 72A, 72B, 73.

The foregoing is accomplished by the separation of contacts 238 (FIG. 4) which disconnects the B+ power supply from the spades of the magnetrons 80, 84 and 163, the common circuit for which is by way of conductor 238A. The interruption of the spade power supply effectively extinguishes the electron beams in the magnetrons preparatory to their establishment between the cathodes and other targets that accord with the setting of the contact devices 70A, 70B, etc.

After contacts 238 separate and the magnetron beams extinguished, contacts 239 and 248 engage. Contacts 239 reapply the B+ voltage to the spades and contacts 248 ground the particular spades in the magnetrons at which the beam is to be formed. After the beams are thus formed in the start of line position, contacts 238 reengage and contacts 239 and 248 separate so that the circuits are in the proper condition for keyboarding of a line.

If it is next assumed that the keyboarded line is to be quadded right, the line remainder will be coded directly as ems and units-of-an-em after the quad right end-of-line signal. As in aforementioned Patent 2,848,049, the quad right answer signal will be coded as three bits of information, namely, ems tens, ems units, and units-of-an-em, the first two bits giving the ems remainder.

Figure 5:
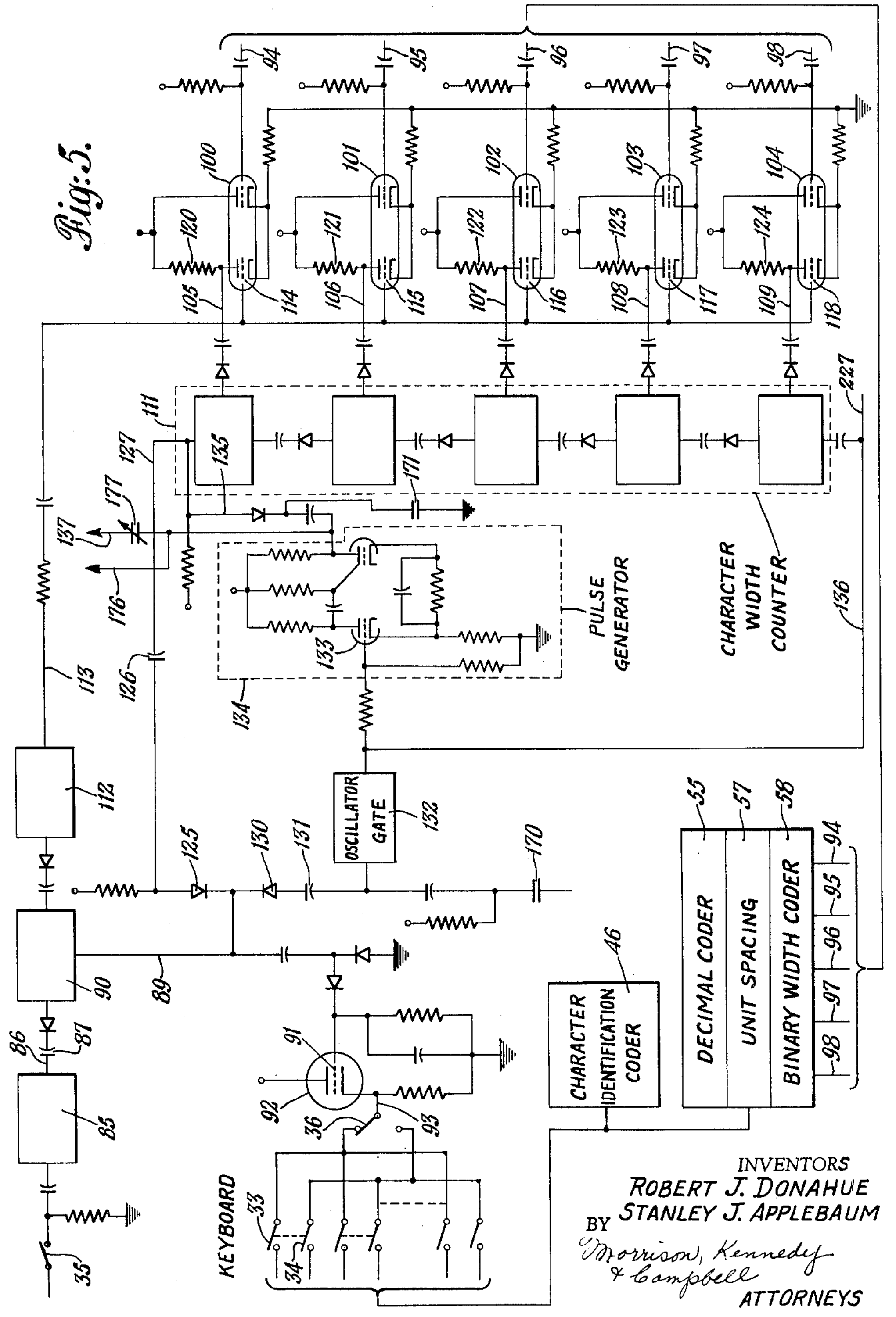
FIG. 5 is a schematic circuit diagram, partially in block form, showing particularly the pulse generating circuits for introducing character width information to the computer circuits and the line length indicator circuits.
Figure 8:
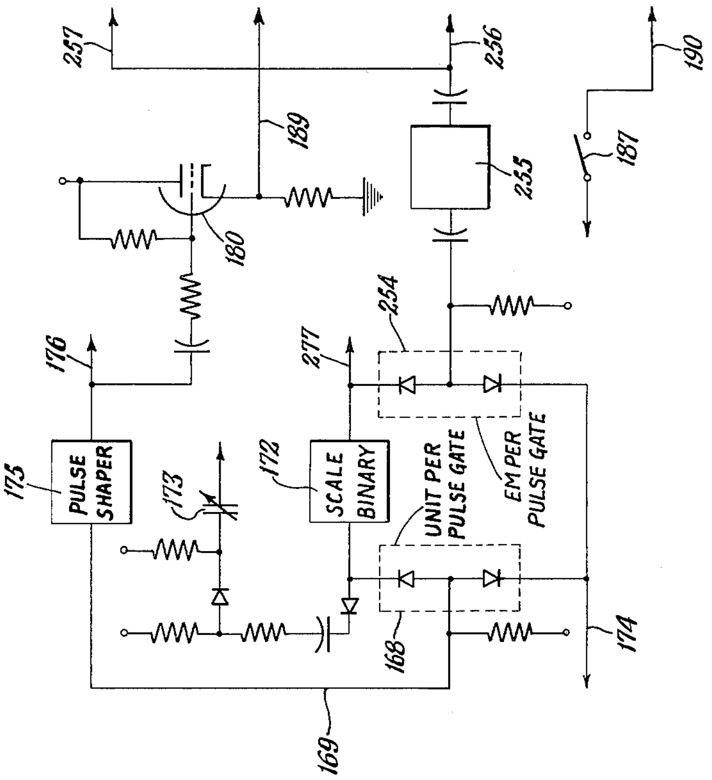
FIGS. 8, 9 and 10 are portions of a schematic circuit diagram in block form showing particularly the computer mechanism for determining justification, quad right and centering information.

As in the case of justification answer computing, the end-of-line operational sequence will close contacts 170 to pulse the oscillator gate 132 and thereby initiate generation of a train of pulses in oscillator 134 (FIG. 5). The pulses are transmitted over conductor 174 to the scale binary component 172 (FIG. 8). When quadding right and centering, the scale binary is conditioned by contacts 173 so that "and" gate 254 (rather than "and" gate 168) will pass the pulses being transmitted over conductor 174. The pulses, therefore, pass to the "one shot" monostable multivibrator 255 where they are shaped, and then by way of conductor 256 to the trigger multivibrator 154 for the ems-ones magnetron 80 which is thereupon switched as hereinbefore described. It is now obvious that by means of the scale binary 172, each pulse generated by oscillator 134 represents either a unit-of-an-em, as in the case of computation of the justification answer, or an em as in the case of computation of the quad right or centering answer. The reason for employing such a device is that the line remainder in lines that are to be quadded right or centered is generally large in comparison to the line remainder in a line that is to be justified, and consequently the computation of the end-of-line answer for quad right or centered lines would take too long to count down if the count down was done in units-of-an-em.

The pulses emanating from multivibrator 255 and representing ems also are transmitted by conductors 257 and 209 to the first stage 211 of the binary counter 210. When quadding right information is being converted to useable form, stages 211, 212, 213 and 214 of counter 210 are utilized to provide ems units information. Stages 260, 261, 262 and 263 are similarly connected as a binary counter 235 and these are utilized to provide ems tens information. Stage 260 is also connected directly to stage 214 by conductor 264 so that it becomes the fifth state of a binary counter. It is so used for justification answer computation when the quotient answer can be greater than would be provided by a four stage counter.

The pulses continue to be fed to the ems ones counter until a count of ten is reached. At this time, stages 212 and 214 are in their counting state and a pulse is delivered by conductors 265 and 266, through contacts 267 (which are engaged for quad right and centering operations) to the grid of the ten ems units recognition triode 270 (FIG. 10). The pulse interrupts conduction in the tube so that a negative pulse is generated. The pulse is transmitted to conductor 271 which is appropriately connected to each stage of the ems units counter so that each stage of the counter is reset to its zero count state. The pulse is transmitted through diode 253 to conductor 264, which is connected to the input circuit of the first stage of the ems tens counter 235. Therefore a count of one is introduced to the ems tens counter for each ten pulses delivered to the ems ones counter.

The operation of the apparatus continues in the manner indicated until such time as the line remainder count registered in the magnetrons 163, 80 and 84 and multivibrator 83 show that a line remainder of less than two ems remains to be accounted for. This condition is monitored by conductors 272 and 273 connected, respectively, to the number one target of ems ones magnetron 80 and the number zero target of ems tens magnetron 163 (FIG. 3). The conductors are merged in "and" gate 274 which is connected to the grid 275 of triode 276. As triode 276 is cut off, a negative pulse is transmitted over conductor 277 to flip the scale binary multivibrator to its other state of operation. The result is to render gate 168 effective rather than gate 254 and the pulses being delivered from oscillator 134 to be transmitted over conductor 169 where they represent units-of-an-em rather than ems.

The pulses now go through pulse shaper 175 to the trigger 140 for units-of-an-em units magnetron 84. Consequently, the further count down in the line is accomplished in units-of-an-em. The pulses are also transmitted to the first stage of counter 191 which for quadded right and centered lines is the units-of-an-em remainder counter. When the count in the counter reaches eighteen, an eighteen units-of-an-em, or one em, recognition circuit is energized (FIG. 9). This is through diodes 280 and 281, connected respectively to the second (193) or binary 2, and fifth (196) or binary 16, stages, and contacts 282 (which are engaged only for quad right and center operation) to the grid of the one-em recognition triode 206. The tube is cut off and a negative pulse is delivered to the "one shot" multivibrator 207 which by means of conductor 209 delivers a single pulse to the ems ones counter 210. The "one shot" also delivers a pulse to the reset triode 216 which is operated to send a reset pulse to the reset line 217 to reset the stages of counter 191 to their zero count state.

The pulses generated by the oscillator continue to count down the indicator magetrons and when a zero ems, zero units-of-an-em condition is reached, the oscillator is shut off as hereinbefore described. At this point, the line remainder will be stored in the various counters in a form which can be readily used in the photographic unit (see application Serial No. 696,448, filed November 14, 1957) of the overall photocomposing machine. The information is stored in counter 235 (stages 260, 261, 262 and 263) as ems tens, in counter 210 (stages 211, 212, 213 and 214) as ems ones, and in counter 191 (stages 192, 193, 194, 195 and 196) as units-of-an-em remainder. Of course, if the line was being centered rather than quadded right, the counters 235 and 210 would be similarly actuated for the same line remainder, but the answer would be read as ens units and ens tens by virtue of the end-of-line center signal which immediately precedes the answer signal on the control tape. The counter 191 will be similarly actuated for a centering operation but by relay switching the counter stages will be connected to the perforator circuits for the next lower counter stages. In this way, a division by two is effected. The circuits for accomplishing a division by two are shown in Patent 2,848,049.

Next in the end of line sequence, after the oscillator 134 has been shut off and the end of line answer appropriately stored in the counters, the read triode 232 is actuated as before described so that the information stored in the counters is transferred to the control tape. Thereafter, the counters are reset as previously described in preparation for the keyboarding of a new line.

While the particular type of phototypographical machine referred to above is of the two-unit type wherein a keyboard unit produces a coded control tape representative of composed text material and a photographic unit decodes the control tape and records the composed text material represented thereby on a sensitized film, it is to be understood that the present invention in its broader aspects may be employed in a single unit phototypographical machine wherein a line of text material is only temporarily stored in coded form in a memory storage unit or on a magnetic drum or tape.

It is contemplated that many changes could be made to the preferred embodiment of this invention as above described, particularly with regard to the circuitry employed, without departing from the spirit and scope thereof, and therefore it is intended that all matter contained in the above description or shown in the accompanying drawings shall be interpreted as illustrative and not in a limiting sense.

What is claimed is:

1. In a signal producing mechanism, the combination of a keyboard, a character identification code mechanism acting in response to key actuation for producing character identification signals, a pulse-actuated electronic line length indicator apparatus, means for setting said apparatus to accord with a selected value of line length, and electronic means for actuating said indicator apparatus in response to operation of a character key to subtract the set width of the character represented by the key from the preset line length and thereby indicate line remainder, said electronic actuating means including a pulse generator for generating a series of successive pulses equal in number to the units represented by the set width of the selected character.

2. The combination according to claim 1, wherein the electronic subtracting means includes a character width electronic counter which determines the number of pulses transmitted from the pulse generator to the electronic line length indicator apparatus in performing the subtracting operation.

3. The combination according to claim 2, wherein the electronic counter is a binary counter and is conditioned by a binary width coder operated from the character key.

4. The combination according to claim 3, including electric circuitry between the binary width coder and the electronic counter for presetting the counter to a count equal to the complement of the character width whereby, when the number of pulses transmitted to the counter equals the character width, the capacity of the counter will be reached.

5. The combination according to claim 4, including means for transmitting to the counter an additional pulse which acts to reset the counter to a zero count.

6. The combination according to claim 5, including electric circuitry activated by the counter when reset to a zero count to produce an output pulse which shuts off the pulse generator.

7. In a signal producing mechanism, the combination of means for setting the mechanism for the composition of a line of a predetermined length, electronic means conditioned by said setting means for registering the total number of units comprised in said preset line, an electronic register responsive to key actuation during line composition for subtracting from the total the number of units represented by the set widths of the characters in the composed line and thereby registering the number of units in the line remainder, electronic means for computing and coding the registered line remainder information comprising an electronic counter which counts one by one the number of units in the line remainder and temporarily stores said information in coded form, a pulse generator for generating a train of successive pulses to actuate said counter, said generator being activated by the operation of an end-of-line (quad right or centering) key, and means actuated by said electronic computing and coding means for producing a signal representative of the coded line remainder information.

8. The combination according to claim 7, wherein the number of units in the line remainder is coded in ems and units of an em.

9. The combination according to claim 7, wherein the electronic counter is of the binary type and includes three interconnected counter units, one for ems-tens, one for ems-ones and one for units-of-an-em.

10. The combination according to claim 7, wherein the electronic counter is restored to a zero count after the signal representative of the coded line remainder information has been produced.

11. The combination according to claim 7, wherein the electronic counter is activated by operation of an end-of-line (quad right or centering) key.

12. The combination according to claim 7, wherein the electronic counter is deactivated by the electronic register when the number of units in the line remainder becomes zero.

13. The combination according to claim 7, wherein the electronic counter is of the binary type and includes three interconnected counter units, one for ems-tens, one for ems-ones and one for units-of-an-em, and wherein the individual pulses from the generator are first transmitted to the ems-ones counter until the number of units in the line remainder drops to a given value in ems and are thereafter transmitted to the units-of-an-em counter until the line remainder becomes zero.

14. In a signal producing mechanism, the combination of means for setting the mechanism for the composition of a justified line of a predetermined length, electronic means conditioned by said setting means for registering the total number of units comprised in said preset line, electronic means responsive to key actuation during line composition for subtracting from the total the number of units represented by the set widths of the characters and word spaces in the composed line and thereby registering the number of units in the line remainder, and an electronic justification computer for dividing the number of units in the line remainder by the number of word spaces in the composed line and coding the quotient and quotient remainder information, said computer comprising an electronic counter responsive to actuation of the word space key and which determines and temporarily stores the number of word spaces in the composed line, a second electronic counter responsive to the actuation of an end-of-line (justification) key and which determines the number of units in the line remainder, an electronic coincidence unit which determines the number of units counted by the second or unit counter by the number of word spaces stored in the word space counter to give the quotient information, and a third electronic counter actuated by the coincidence unit and which temporarily stores the quotient information, together with means actuated by said electronic justification computer for producing a signal representative of the coded quotient and quotient remainder information, the number of units remaining in the second or unit counter after the quotient information has been determined by the coincidence unit being temporarily stored in said second counter.

15. The combination according to claim 14, including electric circuitry for restoring the electronic counters to a zero count after the signal representative of the coded justification information has been produced.

16. The combination according to claim 14, including electric circuitry for deactivating the electronic counters by the electronic register when the number of units in the line remainder becomes zero.

17. The combination according to claim 14, including a pulse generator for generating a series of successive pulses, and circuitry for activating said pulse generator in response to the operation of the end-of-line (justification) key.

18. The combination according to claim 17, wherein the second electronic counter is of the binary type and includes a units-of-an-em-ones counter unit, and wherein the individual pulses from the generator are transmitted to said counter unit until the line remainder becomes zero.

19. In a machine for producing a coded tape representative of a composed line of type characters which vary in set widths on a units-of-an-em basis, the combination of a keyboard, a pulse counter which is settable to accord with the desired line length in units of an em, a character width counter which has a fixed capacity that exceeds the maximum character width and which is settable each time a character key is depressed to a count that is equal to the capacity of the counter minus the width of the character represented by the depressed key, a pulse generator, means for controlling the pulse generator so that it delivers a succession of pulses to the pulse counter and to the character width counter until the capacity of the latter is reached, whereby in the pulse counter the widths of individual characters are subtracted from the initially set line length to give a continuing line remainder count, means for controlling the pulse generator after a key is depressed for the last character in the line so that a succession of pulses are delivered to the pulse counter until the count therein is reduced to zero, and means for delivering the pulses that are required to reduce the count in the pulse counter to zero to an answer computing device wherein a justification, quad right or centering answer, as selected, is computed.

20. In a machine for producing a coded tape representative of a composed line of type characters which vary in set width on a units-of an-em basis, the combination of a keyboard, a pulse generator, mechanism for controlling said pulse generator so that it generates a number of successive pulses equal to the unit width of a typographical character represented by a depressed key, a pulse-actuated electronic line length indicator, means for setting said indicator to accord with a predetermined justified line length, and means for transmitting pulses as they are generated by said pulse generator during line composition to said line length indicator and actuate the latter to indicate the line remainder.

21. The combination according to claim 20, wherein the mechanism for controlling the pulse generator includes a bistable multivibrator gate, means comprising universal keyboard switch contacts for actuating said gate to a first operating state to initiate the generation of pulses by said generaor, and means controlled by the depression of a character key for actuating said gate to a second operating state to arrest the generation of pulses by said generator when a number of pulses equal to the unit width of the character represented by the depressed key have been generated.

22. The combination according to claim 21, wherein the means for arresting the generation of pulses includes an electronic counter, and means for producing an output pulse from said counter and transmitting it to said multivibrator gate to cause said gate to be switched to its second opening state.

23. The combination according to claim 22, wherein the output pulse producing means includes means for presetting said counter to a count equal to the capacity of the counter minus the count equal to the set width of the character.

24. The combination according to claim 23, including means for increasing the preset count of the counter by one.

25. The combination according to claim 23, wherein the electronic counter is a binary counter and the presetting means include a pair of electronic tubes associated with each state of the counter, means for pulsing the grid of one tube of each pair of electronic tubes, means for firing the other tube of each pair of tubes selectively depending on whether or not it is associated with a counter stage having a value that is included in the binary equivalent of the set width of the character represented by a depressed character key, means connecting the two tubes of each pair whereby, if said other tube is fired, the bias on said one tube is increased so that it does not fire in response to its grid being pulsed, and means connecting said one tube to its associated counter stage whereby when said one tube is fired in response to its grid being pulsed said counter stage is switched to a counting state.

26. The combination according to claim 20, wherein the line length indicator includes a first cold cathode tube representative of units-of-an-em ones and having a plurality of cathodes each of which is formed as a numeral that glows when a potential is applied thereto.

27. The combination according to claim 26, including means connected to the pulse generator for applying a potential to the cathodes of said cold cathode tube successively in response to a succession of pulses from said pulse generator.

28. The combination according to claim 27, including an electronic switching tube having a common cathode and a plurality of tube elements, one for each cathode of said cold cathode tube, the electron beam in said switching tube extending between the common cathode thereof and one of said tube elements, each of said tube elements being connected to its associated cathode of said cold cathode tube, the cathode of said cold cathode tube being illuminated when the electron beam in said switching tube extends to the tube element therein associated with the illuminated cathode, and means for switching the electron beam from tube element to tube element in response to pulses from said pulse generator.

29. The combination according to claim 28, wherein said switching tube includes a plurality of switching grids, one for each tube element, connected in two groups, and wherein the switching means is a bistable multivibrator having one tube thereof connected to one group of switching grids and the second tube thereof connected to the other group of switching grids, said multivibrator being actuated by the pulses from said pulse generator.

30. The combination according to claim 29, including means actuated by the means for setting the indicator for justified line length to condition the switching tube so that the desired cathode of the cold cathode tube is illuminated and the first pulse from the pulse generator is caused to actuate the bistable multivibrator to apply a bias on the proper group of switching grids to effect a transfer of the electron beam in the switching tube.

31. The combination according to claim 29, wherein the line length indicator also includes a second cold cathode tube representative of units-of-an-em tens and having at least two cathodes formed as the numerals one and zero, and switching means associated with said second cold cathode tube for energizing either the one or the zero cathode.

32. The combination according to claim 31, wherein the switching means for the second cold cathode tube is a bistable multivibrator having one tube thereof connected to the one cathode and the other tube thereof connected to the zero cathode, and means responsive to the switching tube of the first cold cathode tube when causing the illumination of the number nine cathode for pulsing said multivibrator switching means to illuminate either the one cathode or the zero cathode of said second cold cathode tube.

33. The combination according to claim 31, including means for causing the illumination of the first cold cathode tube to switch from the zero cathode to the seven cathode in response to a single pulse from said pulse generator when said second cold cathode tube is energized to illuminate its one cathode.

34. The combination according to claim 31, wherein the line length indicator also includes a third cold cathode tube representative of ems-ones and an associated electronic switching tube, and means for pulsing said electronic switching tube when the first cold cathode tube and second cold cathode are pulsed from a condition in which the zero cathodes in both of said tubes are illuminated.

35. The combination according to claim 34, wherein the line length indicator also includes a fourth cold cathode tube representative of ems-tens and an associated electronic switching tube, and means for pulsing said electronic switching tube when the third cold cathode tube is switched to illuminate its number nine cathode.

36. In a machine for producing a coded tape representative of a composed line of type characters which vary in set width of a units-of-an-em basis, the combination with character keys for coding character signals on the tape, a space key for coding space signals on the tape, and additional keys for coding function and answer signals which control photographic composition of the coded characters, of a counting mechanism that is operable in response to actuation of said space and character keys to total the set widths of the characters and normal spaces represented by the actuated keys, means for setting said counting mechanism to accord with a predetermined justified line length, a temporary word space counter for totalling the number of word spaces in a composed line, pulse generator means responsive to actuation of a function key for generating a train of successive pulses, a first digital counter to which said train of pulses is transmitted, means for detecting coincidence between the count in said first counter and the count in said word space counter, a second digital counter for counting the number of times the count in said first counter and said word space counter coincide, and means for arresting the generation of pulses when the line deficit in said counting mechanism is reduced to zero, whereby the second counter has stored therein a count equal to the justification quotient value and the first counter has stored therein a count equal to the justification quotient remainder value.

37. The combination according to claim 36, including automatic means for coding the justification quotient value and the justification quotient remainder value, and signal producing mechanism actuated by said automatic coding means for producing on the tape corresponding justification signals.

38. The combination according to claim 37, including means operable after the justification signals are produced on the tape for resetting said word space counter, said first counter and said second counter to a zero count.

39. The combination according to claim 37, including means operable after the justification signals are produced on the tape for resetting said counting mechanism to its preset value.

40. The combination according to claim 36, including means responsive to the detection of coincidence between the count in said first counter and the count in said word space counter for resetting said first counter to a zero count.

41. The combination according to claim 36, wherein said counting mechanism includes a plurality of electronic components, each having an element which when operative represents a zero count for that element, and other elements which when individually operative represent a numeric count, and wherein said line length presetting means includes manually operated switching devices for setting each electronic component such that the initially operative elements thereof represent the justified line length.

42. The combination according to claim 41, wherein the electronic components represent the ems-tens, ems-ones, units-of-an-em tens, and units-of-an-em ones of line length, and wherein the components are interconnected so that each time the units-of-an-em ones component, in response to pulses from a pulse generator, is switched from its zero operative state to its next numeric operative state the units-of-an-em tens component is switched to its next lower numeric operative state, and each time the units-of-an-em tens component is switched from its zero operative state to its next numeric operative state the ems ones component is switched to its next lower numeric operative state, and each time the ems ones component is switched from its zero operative state to its next numeric operative state the ems tens component is switched to its next lower numeric operative state, and wherein the pulse generator means in response to actuation of the space and character keys generates a number of pulses equal to the cumulative set widths of the characters and normal word spaces in a line, including means connecting said pulse generator to the aforesaid units-of-an-em ones component of said counting mechanism, and means for signalling the keyboard operator when the electronic components have been switched to their operative states representing the justification zone.

43. In a machine for producing a coded tape representative of a composed line of type characters which vary in set width on a units-of-an-em basis, the combination with character keys for coding character signals on the tape, a space key for coding space signals on the tape, and additional keys for coding function and answer signals which control photographic composition of the coded characters, of a counting mechanism that is operable in response to actuation of said space and character keys to total the set widths of the characters and normal spaces represented by the actuated keys, means for setting said counting means to a predetermined justified line length, a pulse generator responsive to actuation of a function key for generating a train of successive pulses, a first counter in which is stored the units-of-an-em line remainder, a second counter in which is stored the ems-ones line remainder, a third counter in which is stored the ems-tens line remainder, means for transmitting pulses from said pulse generator to said first counter, means responsive to the count in said first counter reaching a value equal to the number of units-of-an-em in an em for delivering a pulse to said second counter and resetting said first counter to a zero count, means responsive to the count in said second counter reaching the value ten for delivering a pulse to said third counter and resetting said second counter to a zero count, and means for arresting the generation of pulses when the line deficit in said counting mechanism is reduced to zero.

44. The combination according to claim 43, including means for transmitting pulses from said pulse generator to said second counter whereby each pulse generated represents one em of line deficit.

45. The combination according to claim 44, including selector means for rendering effective the means for transmitting pulses from the pulse generator to said second counter or the means for transmitting pulses from the pulse generator to said first counter, as may be desired.

46. The combination according to claim 45, including means responsive to the reduction of the line deficit in said counting mechanism to a predetermined value for rendering said selector means effective to arrest the transmission of pulses from said pulse generator to said second counter and to initiate transmission of pulses to said first counter.

47. In a signal producing mechanism, the combination of a keyboard, a character identification code mechanism acting in response to key actuation for producing character identification signals, an electronic line length indicator apparatus comprising at least one cold cathode tube having cathodes shaped in the form of numerals and having a switching device to energize a selected cathode to indicate a corresponding value, means for presetting said indicator apparatus by energizing said switching device to accord with a selected value of line length, and electronic means for actuating said tube switching device in response to operation of a character key to subtract the set width of the character represented by the key from the preset line length and thereby indicate line remainder.

48. The combination according to claim 47, wherein the tube switching device is in the form of an electronic beam switching tube.

49. The combination according to claim 48, wherein the electronic means for actuating the tube switching device includes a bistable multivibrator which controls the switching of the beam in the beam switching tube during line composition.

50. The combination according to claim 47, wherein the keyboard includes a space key, and wherein the electronic means for actuating the tube switching device is also responsive to the operation of said space key.

51. In a signal producing mechanism, the combination of a keyboard, a character identification code mechanism acting in response to key actuation for producing character identification signals, an electronic line length indicator apparatus comprising a pair of cold cathode tubes having cathodes shaped in the form of digits representative of ems-tens and ems-ones, respectively, and having a pair of switching devices, one for each tube, to energize selected cathodes in the respective tubes to indicate a corresponding value in total ems, means for presetting said indicator apparatus by energizing said tube switching devices to accord with a selected value of line length, and electronic means for actuating said tube switching devices in response to operation of a character key to subtract the set width of the character represented by the key from the preset line length and thereby indicate line remainder.

52. In a signal producing mechanism, the combination of a keyboard, a character identification code mechanism acting in response to key actuation for producing character identification signals, an electronic line length indicator apparatus comprising a pair of cold cathode tubes having cathodes shaped in the form of digits representative of units-of-an-em-tens and units-of-an-em-ones, respectively, and having a pair of switching devices, one for each tube, to energize selected cathodes in the respective tubes to indicate a corresponding value in total units of an em, means for presetting said indicator apparatus by energizing said tube switching devices to accord with a selected value of line length, and electronic means for actuating said tube switching devices in response to operation of a character key to subtract the set width of the character represented by the key from the preset line length and thereby indicate line remainder.

53. The combination according to claim 52, wherein the switching device for the units-of-an-em-tens cathode tube is in the form of a bistable multivibrator.

54. In a signal producing mechanism, the combination of a keyboard, a character identification code mechanism acting in response to key actuation for producing character identification signals, an electronic line length indicator apparatus comprising two pairs of cold cathode tubes, those of one pair having cathodes shaped in the form of digits representative of ems-tens and ems-ones, respectively, and those of the other pair having cathodes shaped in the form of digits representative of units-of-an-em-tens and units-of-an-em-ones, respectively, said indicator apparatus further comprising switching devices, one for each tube, to energize selected cathodes in the respective tubes to indicate a corresponding value in total ems in the first pair of tubes and in total units of an em in the second pair of tubes, means for presetting said indicator apparatus by energizing said tube switching devices to accord with a selected value of line length, and electronic means for actuating said tube switching devices in response to operation of a character key to subtract the set width of the character represented by the key from the preset line length and thereby indicate line remainder.

55. The combination according to claim 54, wherein the switching devices for the ems-tens and ems-ones cathode tubes as well as for the units-of-an-em-ones cathode tubes are in the form of beam switching tubes while the switching device for the units-of-an-em-tens cathode tube is in the form of a bistable multivibrator.

References Cited in the file of this patent

UNITED STATES PATENTS

| | | |
|---|---|---|
| 2,762,485 | Bafour et al. | Sept. 11, 1956 |
| 2,847,919 | Rossetto et al. | Aug. 19, 1958 |
| 2,848,049 | Robbins et al. | Aug. 19, 1958 |
| 2,888,556 | Richards | May 26, 1959 |
| 2,889,987 | Marcus et al. | June 9, 1959 |

UNITED STATES PATENT OFFICE

CERTIFICATE OF CORRECTION

Patent No. 3,056,545

October 2, 1962

Robert J. Donahue et al.

It is hereby certified that error appears in the above numbered p ent requiring correction and that the said Letters Patent should read corrected below.

Column 1, line 54, for "deignated" read -- designated --; line 61, for "linge" read -- line --; line 62, for "i" read -- is --; column 2, line 52, for "remaider" read -- remainder --; column 6, line 64, for "centeral" read -- central --; column 16, line 71, for "end-o-" read -- end-of- --; column 19, line 70, for "opening" read -- operating --.

Signed and sealed this 19th day of February 1963.

(SEAL)
Attest:

ESTON G. JOHNSON
Attesting Officer

DAVID L. LADD
Commissioner of Patent